(12) United States Patent
Barragan Trevino et al.

(10) Patent No.: US 8,487,744 B2
(45) Date of Patent: *Jul. 16, 2013

(54) REMOTELY MONITORING FIELD ASSETS

(75) Inventors: Alfonso Javier Barragan Trevino, Monterrey (MX); Herbert Rose, Ashburn, VA (US)

(73) Assignee: Vendwatch Telematics, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/587,329

(22) Filed: Aug. 16, 2012

(65) Prior Publication Data

US 2012/0311149 A1 Dec. 6, 2012

Related U.S. Application Data

(63) Continuation of application No. 12/353,695, filed on Jan. 14, 2009, now Pat. No. 8,269,604.

(51) Int. Cl.
*G05B 19/00* (2006.01)
*H04Q 5/22* (2006.01)
*G06F 17/00* (2006.01)

(52) U.S. Cl.
USPC ........ 340/5.92; 340/10.41; 700/233; 700/236

(58) Field of Classification Search
USPC ................. 340/10.1, 572.1; 235/385; 705/22, 705/28–29; 700/215–229
See application file for complete search history.

(56) References Cited

U.S. PATENT DOCUMENTS

| | | |
|---|---|---|
| 2003/0118353 A1 | 6/2003 | Baller et al. |
| 2003/0125836 A1 | 7/2003 | Chirnomas |
| 2003/0214904 A1 | 11/2003 | Bois et al. |
| 2005/0222933 A1 | 10/2005 | Wesby |
| 2006/0106490 A1 | 5/2006 | Howell et al. |
| 2008/0013502 A1* | 1/2008 | Clark ............................ 370/338 |
| 2009/0069642 A1 | 3/2009 | Gao et al. |
| 2011/0084806 A1 | 4/2011 | Perkins |

* cited by examiner

*Primary Examiner* — Brian Zimmerman
*Assistant Examiner* — Omeed Alizada
(74) *Attorney, Agent, or Firm* — Trop, Pruner & Hu, P.C.

(57) ABSTRACT

Disclosed methods, systems, and apparatuses remotely monitor a plurality of field assets. Device discovery is conducted to find a communication path through a master controller to an operations center. A plurality of states are monitored for individual field assets of the plurality of field assets. In response to trigger events, monitored states are selectively included in data sets that may be parsed, compressed, encrypted, and forwarded through a mesh network to an operations center.

24 Claims, 4 Drawing Sheets

REMOTELY MONITORING FIELD ASSETS

This application is a continuation of U.S. patent application Ser. No. 12/353,695, filed Jan. 14, 2009, now U.S. Pat. No. 8,269,604 the content of which is hereby incorporated by reference.

BACKGROUND

1. Field of the Disclosure

The present disclosure generally relates to monitoring field assets.

2. Description of the Related Art

Field assets such as vending machines may be monitored manually to check inventory levels. Manually monitoring such field assets may be cost-prohibitive and time-consuming.

DESCRIPTION OF THE EMBODIMENTS

Figure 1:
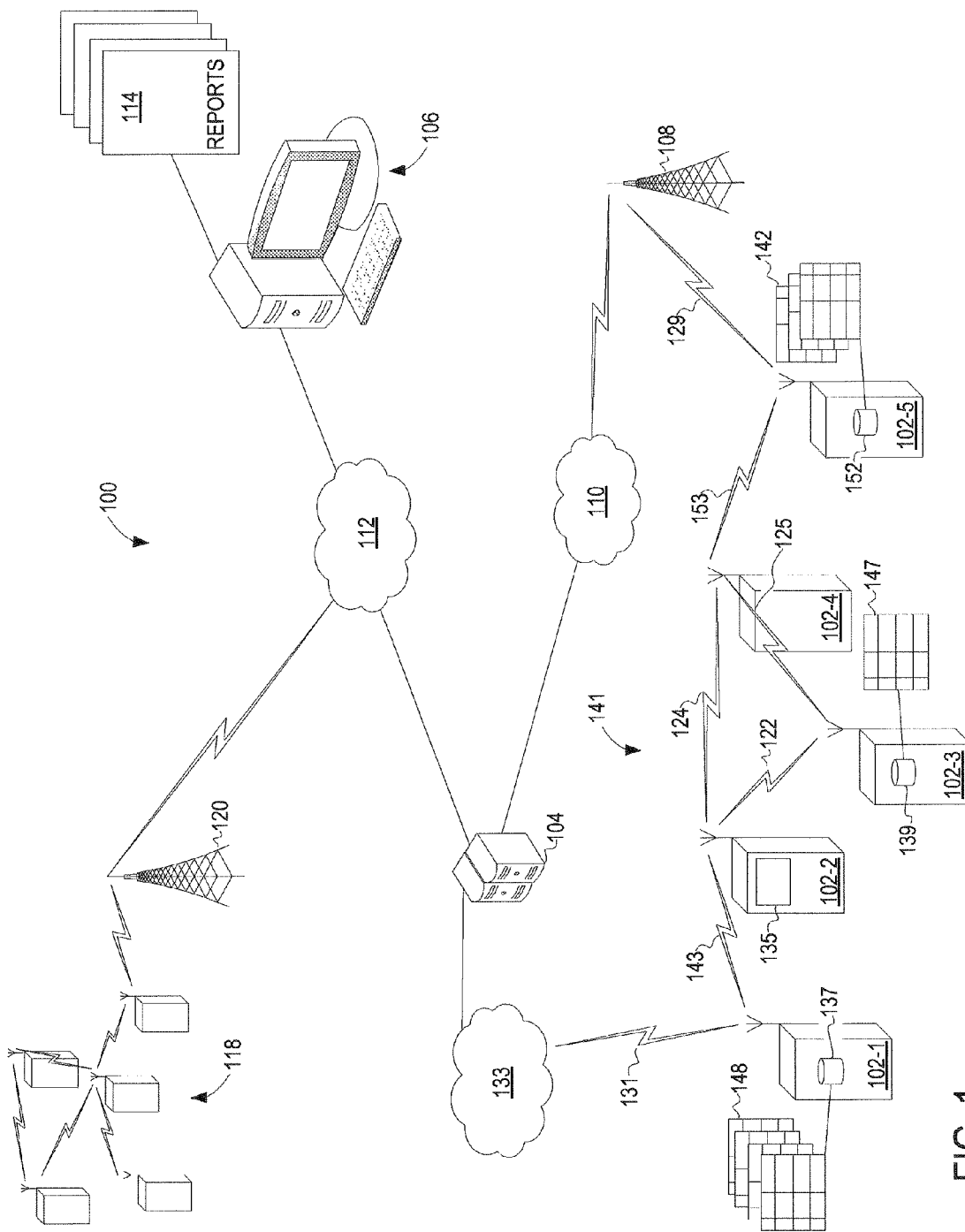
FIG. 1 illustrates a representative environment for remotely monitoring field assets in accordance with disclosed embodiments.

In accordance with disclosed embodiments, an operations center may request specific information regarding one or more field assets. For example, an operations center may ping one or more field assets to determine whether any field assets are low on product inventory. Such a ping is a trigger event that causes field assets to respond with any relevant data. Accordingly, the operations center may broadcast to each remote asset a request for product inventory levels. In response, and if necessary, each remote asset may conduct device discovery and find a communication path to the operations center. In some embodiments, the communication path includes a master controller located in or local to one of the remote assets. Client controllers may time their transmissions of inventory levels to accomplish collision avoidance by determining whether other field assets within a cluster are then communicating. In this way, field assets wait their turn and do not "talk over" one another. Additionally, remote assets may communicate through a mesh network and find an optimized primary path and optimized secondary path for transmission of a requested data set to the operations center. In this way, a requested data set may be sent through a series of field assets with client controllers that successively forward the requested data set through one or more master controllers to the operations center. In some cases, communication paths remain static; however, malfunctions and other events may dictate that individual remote assets within a cluster dynamically adjust to changes in available communication paths. Accordingly, disclosed embodiments may include self adjusting features that adapt to changing conditions regarding available paths to optimize delivery of requested data sets to operation centers while minimizing the risk of interference.

In one aspect, a disclosed method of remotely monitoring a plurality of field assets includes conducting device discovery to find a communication path through a master controller to an operations center. In some embodiments, the communication path is through at least one client controller that is in direct communication with one or more other field assets. A plurality of states for individual field assets are monitored and may be assembled into one or more data blocks. Example states that may be monitored include product inventory amounts, currency inventory amounts, sales data, temperature data, alarm data, and other operational data. In some embodiments, the monitored states are parsed, combined compressed, encrypted and encoded. Responsive to a trigger event, the encoded states may be transmitted to an operations center. Trigger events may be from a master controller, from an alarm state, from a scheduled report interval (e.g., timeout), or from user input at the operations center. The master controller may be associated with a subscriber identity module (SIM), and in some embodiments, the master controller communicates through a transceiver using one or more mobile telephone protocols.

In another aspect, a disclosed field asset tracking system includes a product detection system, a currency tracking system, a transaction report system, and an operating conditions system. The product detection system contributes product inventory information to a data set. Similarly, the currency tracking system contributes currency inventory information, the transaction report system contributes transaction information, and the operating conditions system contributes operating condition information to the data set. The field asset tracking system includes a controller communicatively coupled to each of the product detection system, the currency tracking system, the transaction report system, and the operating conditions system. A transmitter adapted for transmitting a portion of the data set is communicatively coupled to the controller, at least one operations center, a local (i.e., local to the transmitter) field asset, and a remote (i.e., remote from the transmitter) field asset. In some embodiments, the disclosed field asset tracking system includes an encoder that parses, combines, compresses, encrypts and encodes the data set. A report generator included with the field asset tracking system extracts data from the data set on a per field-asset basis. The data set may include a DEX industry standard format, which is a protocol for digital exchange in the vending machine industry. Some disclosed field asset tracking systems include a further transmitter communicatively coupled to a cluster of further field assets. Local transmitters may communicate using IEEE 802.15.4 low-rate wireless personal area network (WPAN) standards and other such protocols. In some embodiments, local transmitters time their transmissions to avoid collisions with other transmitted signals.

In still another aspect, an apparatus is disclosed for processing field asset data. The apparatus includes a processor for generating a local data set responsive to a trigger event. The local data set includes one or more of: currency inventory information (e.g., cash in bill validation units or coins in coin collection devices), product inventory information, transaction information (e.g., sales of units by selection, cashless transactions, etc.), alarm status, door openings, and operating condition information. The apparatus further includes a receiver enabled for receiving a remote data set from one or more remote field assets. A compression system integrates the remote data set and the local data set into a data block and a transmitter sends the data block to a master controller for further routing to an operations center.

In the following description, details are set forth by way of example to enable one of ordinary skill in the art to practice the claimed subject matter without undue experimentation. It should be apparent to a person of ordinary skill that disclosed embodiments are examples and not exhaustive of all possible embodiments. Regarding reference numerals used to describe elements in the figures, a hyphenated form of a reference numeral typically refers to a specific instance of an element and the un-hyphenated form of the reference numeral typically refers to the element generically or collectively. Thus, for example, element "102-1" refers to an instance of a field asset, which may be referred to collectively as field assets 102, and any one of which may be referred to generically as a field asset 102.

FIG. 1 illustrates a representative environment 100 for remotely monitoring field assets in accordance with disclosed embodiments. As shown, field assets 102-1 through 102-5 form a first cluster 141 of remote assets (e.g., vending machines). First cluster 141 communicates with operations server 104 through communication asset 108 (e.g., mobile telephone tower or WiFi hotspot). In some embodiments, operations server 104 resides at a co-location or operations center that assembles operation and inventory data from multiple sources including first cluster 141 and second cluster 118. As shown, second cluster 118 communicates through communication asset 120 (e.g., a cellular telephone tower or WiFi hotspot), through network 112 (e.g., an Internet, a wide-area network, local area network, etc.) with operations server 104. Communication asset 108 may communicate wirelessly or through wired connections through network 110 with operations server 104. Operational and inventory data collected and assembled by operations server 104 may be accessed by client 106 (e.g., a data processing system), may be in the form of one or more reports 114, and may be presented on a per field-asset basis. A user may send information requests from client 106 to first cluster 141 and/or second cluster 118 to request specific information and data. In addition, a user may configure, program, troubleshoot, or monitor (e.g., in substantial real-time) selected field assets in first cluster 141 or second cluster 118 using client 106.

Field assets 102-1 through 102-5 are enabled for device discovery and determination of an optimal path for efficiently sending data to operations server 104. During device discovery, assets 102-1 through 102-5 may respond to trigger events, scheduled report intervals, user requests, and predetermined conditions for forming field asset clusters and assigning master controller duties to one or more controllers. As shown in FIG. 1, field asset 102-5 has a communication link 129 with communication asset 108 and can therefore serve as a master field asset, with a master controller for first cluster 141. In addition, field asset 102-1 has available a communication link 131 through network 133 to operations server 104 and may serve as a master or comaster field asset. First cluster 141 may operate as a mesh network. Further, first cluster 141 may, in accordance with disclosed embodiments, conduct device discovery and path optimization to discover one or more communication links for sending requested data to operations server 104.

Within first cluster 141, individual field assets may determine an optimal path for sending operational and inventory data. In addition, individual field assets may practice collision avoidance techniques to prevent interference. For example, transmissions from separate field assets may occur at slightly different frequencies or at different times. Redundant communication links may also be established between and among field assets to optimize transmission efficiency in the event of outages, malfunctions, or the like. As shown in FIG. 1, field asset 102-2 may communicate with field asset 102-5 through field asset 102-3 (using communication link 122, communication link 125, and communication link 153) or through field asset 102-4 (using communication link 124 and communication link 153). In the event that field asset 102-3 is unable to forward data on behalf of field asset 102-2, then communication link 124 may be used to send the data to field asset 102-5 through field asset 102-4. Alternatively or in addition, data from field asset 102-2 may be multicast to a plurality of field assets including field asset 102-3 (through communication link 122), field asset 102-4 (through communication link 124), and through field asset 102-1 (through communication link 143). Operations server 104 may assemble received data and discard any redundant data that may result from such multicasting.

As shown, field asset 102-3 includes a storage 139 (e.g., a memory or a hard drive), with a data set 147 which may include data blocks with parameters that are monitored and stored regarding field asset 102-3. Data set 147 may be presented in DEX format and may include one or more fields that are requested by a user (e.g., a user of data processing system 106). As shown, complete or partial copies of data set 147 also reside on data set 142, which resides on storage 152, and data set 148, which resides on storage 137. As shown, data set 148 and data set 142 are part of a collection of data sets that may be assembled by one or more master (or co-master) controllers for collecting, parsing, encoding, compressing and sending to operations server 104. As shown, data sets from individual field assets may be multicast to help ensure that the data successfully reaches operations server 104. Operations server 104 may send acknowledgment signals to field assets 102. Such acknowledgment signals may be through broadcast (i.e., to all field assets), through multicast (i.e., to selected field assets), or unicast (i.e., to one field asset, through direct or indirect communication links). In such ways, first cluster 141 and its field assets 102 employ robust, two-way communication links that contribute to secure and efficient transfer of data for field assets 102.

As shown in FIG. 1, field asset 102-1 includes video display 135 for providing a graphical interface that informs a user regarding the status of field assets 102. For example, a user may receive reports on display 135 regarding alarms, inventory levels, sales data, and operating conditions related to any one or more of field assets 102. As shown, the reports may be accessed in real-time in response to user input provided to field asset 102-2. Field assets may be in two-way communication with operations server 104, client 106, or other components and display 135 may provide messages and status information regarding communication channels, for example.

Figure 2:
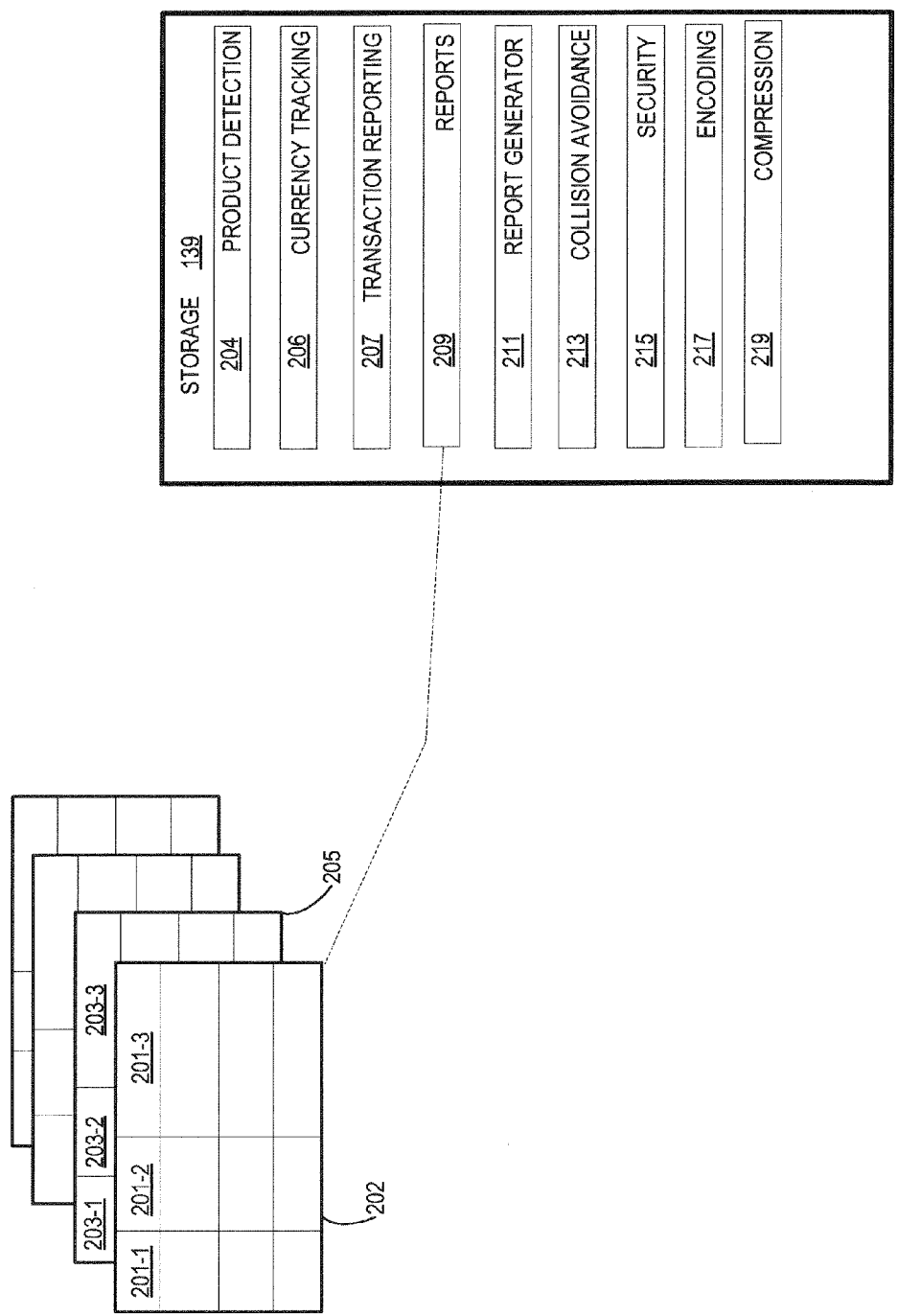
FIG. 2 illustrates additional aspects of a storage from FIG. 1 with modules for remotely monitoring field assets in accordance with disclosed embodiments.

FIG. 2 illustrates additional aspects of a storage with modules (e.g., product detection system 204) for remotely monitoring field assets. As shown, storage 139 includes a plurality of systems that contribute to a data set that is transmitted to an operations center or central data server for tracking one or more field assets (e.g., vending machines). As shown, storage 139 includes product detection system 204 which contributes product inventory information to a data set (e.g., data set 202) that is transmitted from a remote asset or cluster of remote assets to a central data server or operations center. Product detection system 204 may receive signals regarding inventory and functionality from drop sensors and the like. For a monitored field asset that is a vending machine, product detection system 204 may include sensors that detect which products within the field asset are in inventory and available for sale. Accordingly, product detection system 204 may include counters, pressure sensors, infrared sensors, and other sensors that may be used to track or determine inventory levels of products. Currency tracking system 206 contributes currency inventory information to the data set. Currency tracking system 206 may, for example, track the number of pennies, dimes, nickels, quarters, and other coins. In addition, currency tracking system 206 may track the number of $1 bills, $10 bills, $5 bills, and $20 bills in the field asset. Transaction reporting system 207 contributes transaction information to the data set. For example, transaction reporting system 207 may contribute to the data set the total sales amount for a period, the total number of cashless (e.g., credit card sales) sales for the period, the frequency of transactions, the time of transaction, and the total number of transactions.

As shown in FIG. 2, storage 139 includes report generator 211. Report generator 211 processes requests for data and generates customized reports 209 including the requested data. The transmission of data may be overly time-consuming and resource-intensive. In some cases, the cost of transmitting data is directly related to the amount of data transferred. Therefore, report generator 211 optimally only sends the data that is requested. In some embodiments, data is sent in response to predetermined trigger events. Trigger events may be generated locally, such as through persistent alarm states. Trigger events may be based on predetermined parameters (e.g., minimum inventory levels) that are remotely programmed and may be remotely adjusted. Alternatively, trigger events may be based on scheduled report intervals, power outages, or real-time remote requests, as examples.

As a further example of a trigger event, a field asset may be programmed to automatically send to an operations center data related to an alarm state (e.g., a persistent alarm). For example, a trigger event may be set as a temperature alarm in a vending machine that indicates a high temperature for more than two hours (i.e., is persistent). During operation, if the temperature registers high for two hours or some other pre-configured time, and the trigger event correspondingly occurs, report generator 211 generates and stores report 202. As shown, report 202 includes columns 201-1 through 201-3. Columns 201-1 through 201-3 are for illustrative purposes and may be populated with various parameters associated with alarms. For example, each row in a column may be populated with alarm event data, such as the type of alarm, the start time of the alarm, the duration of the alarm status, and the like. Report generator 211 may log information into reports that may be transmitted to an operations center and/or archived locally. As shown, reports 209 include archived report 205 with columns 203-1 through 203-3.

In accordance with some disclosed embodiments, field assets practice collision avoidance to avoid interference while transmitting. Accordingly, collision avoidance system 213 may listen to determine whether other remote assets within a cluster are communicating before attempting to transmit reports. In other cases, transmissions may be timed accordingly to a predetermined schedule. Accordingly, collision avoidance system 213 may process instructions from a master controller or operations center for scheduling the transmission of reports.

In some embodiments, collision avoidance system 213 or other components of storage 139 participate in communication path optimization and device discovery. For example, upon certain events (e.g., installation of a field asset or a reboot), test signals may be generated from client controllers and transmitters. In some cases, such test signals are staggered in time or frequency to prevent interference. A receiver from each field asset may determine the strength of signals received from other remote assets. In some cases, signals are identified by a unique network identifier of the field asset responsible for generating it. Additionally, a timestamp may be associated with a received signal. Through such sessions of device discovery and communication path optimization, a cluster of field devices may automatically configure itself to optimally transmit reports to an operations center. In some cases, based on such sessions, field assets are clustered, reclustered, and sub-clustered to optimize transmission efficiencies.

As shown in FIG. 2, storage 139 includes security system 215 which may associate a security key or other security features (e.g., encryption) with a transmitted data set. Encoding system 217 may employ an encoding or encryption scheme to further secure transmitted data sets and ensure compatibility with one or more communication protocols. In some embodiments, field assets communicate using mobile telephone protocols, Internet protocols, radio frequency transmissions, and the like. In addition, disclosed field assets may use voter comparators to determine which of a plurality of communication paths is more reliable and efficient. In such cases, encoding system 217 may encode data sets and reports for transmission over an optimized communication path. Additionally, encoding system 217 may decode signals and requests sent by operation centers and other field assets. Compression system 219 may employ one or more compression schemes to reduce the size of transmission from field assets. In some embodiments, as data is collected from field assets and passed toward a master controller that communicates with an operations center, the data from multiple remote assets may be compressed and combined to reduce the amount of data that is ultimately transmitted. If a charge is associated with the amount of data sent between communications asset 108 and network 110 (FIG. 1), such compression techniques may save money.

Figure 3:
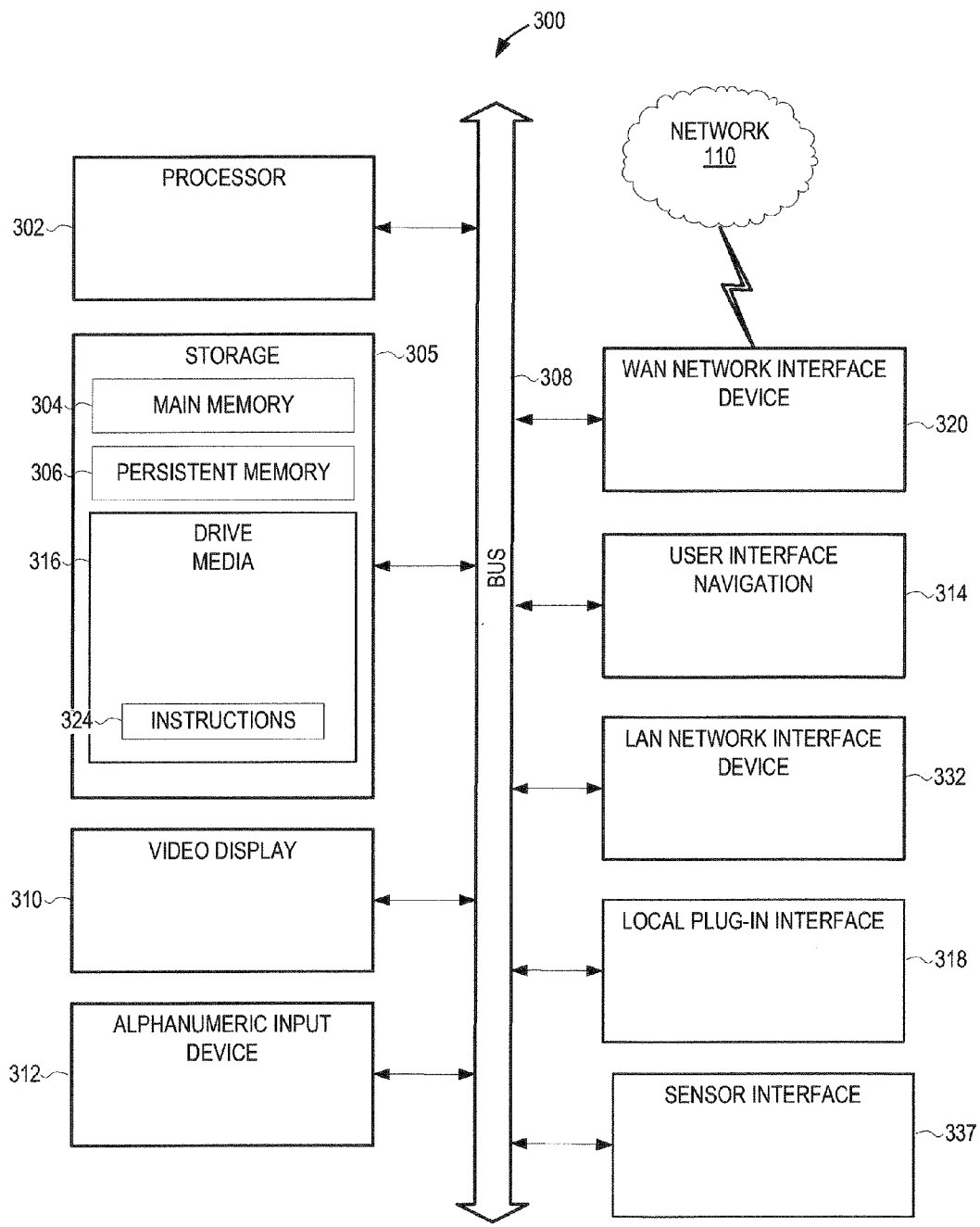
FIG. 3 illustrates a data processing system for use with disclosed embodiments to remotely monitor field assets.

FIG. 3 illustrates, in block diagram form, a data processing system 300 within which a set of instructions may operate to perform one or more of the methodologies discussed herein to remotely monitor field assets. Data processing system 300 may be similar to or identical to controllers (e.g., master controllers, comaster controllers, or client controllers) within field assets 102 (FIG. 1). Data processing system 300 may operate as a standalone device or may be connected (e.g., networked) to other data processing systems. In a networked deployment, data processing system 300 may operate in the capacity of a server or client data processing system (e.g., client 106 in FIG. 1) in a server-client network environment, or as a peer computer in a peer-to-peer (or distributed) network environment. Example data processing systems include, but are not limited to, client controllers for field assets (e.g., vending machines), master controllers for field assets, personal computers (PCs), tablet PCs, personal data assistants, operations center machines, cellular telephones, smart phones, web appliances, network routers, switches, bridges, clients, servers, or any machine capable of executing a set of instructions (sequential or otherwise) that specify actions to be taken by that machine. Further, while only a single data processing system is illustrated, the term "data processing system" should also be taken to include any collection of data processing systems that individually or jointly execute a set (or multiple sets) of instructions to perform any one or more of the methodologies discussed herein.

As shown, data processing system 300 includes a processor 302 (e.g., a microcontroller, a central processing unit, a graphics processing unit, or any combination of the same) and storage 305, which may communicate via bus 308. As shown, storage 305 includes main memory 304, persistent memory 306, and drive media 316. Drive media 316 includes instructions 324 and may be used to store reports and data sets regarding one or more field assets, which may be remote from or local to data processing system 300. Data processing system 300 may further include a video display unit 310 (e.g., a light emitting diode display, a liquid crystal display, or a cathode ray tube display) on which reports, data, and user interfaces for configuring data processing system 300 may be displayed. Video display 310 may be similar to or identical to video display 135 (FIG. 1) and may be populated with status information regarding field assets. In some embodiments, video display 310 is enabled as a touch-screen to receive user input. As shown, data processing system 300 also includes an alphanumeric input device 312 (e.g., a keyboard, roller ball, touch screen, etc.), user interface (UI) navigation device 314 (e.g., a remote control, joystick, or mouse) for navigating a user interface, providing user input regarding reporting, and accessing stored information. As shown, data processing system 300 includes wide area network interface device 320 for communicating with network 110. WAN interface device 320 may communicate using mobile telephone protocols, microwave frequencies, or radio frequencies to an operations center. Alternatively, WAN interface device 320 may communicate through some combination of network cables, fiber optic cables, or telephone lines to the operations center. In any event, WAN network interface device 320 provides a communication link between one or more field assets or clusters of field assets to an operations center or to another component (e.g., a colocation) that is communicatively coupled to an operations center. LAN network interface device 332 provides a communication link between data processing system 300 and other field assets. LAN network interface device may communicate through Bluetooth, radio waves, microwaves, infrared signals, sound waves, telephone lines, network cables, fiber optic cables, or wirelessly using IEEE 802.15.4 low-rate wireless personal area network (WPAN) standards, as examples.

As shown, data processing system 300 includes local plug-in interface 318 which may be used by field personnel to directly connect data processing system 300 to other portable field assets or monitoring equipment. For example, field personnel may carry a laptop computer that communicates directly (wirelessly or otherwise) with data processing system 300 through local plug-in interface 318 to troubleshoot, update, interrogate, or configure data processing system 300, instructions 324, and other components. Sensor interface 337 collects data from one or more sensors (not depicted) including product inventory sensors, temperature sensors, currency inventory sensors, and the like.

As shown, drive media 316 may be embedded with one or more sets of instructions and data structures (e.g., instructions 324) embodying or utilized by any one or more of the methodologies or functions described herein. The instructions 324 may also reside, completely network interface device 320 or within other components of data processing system 300 during execution.

Instructions 324 may further be transmitted or received over a network 110 (e.g., from an operations center) via WAN network interface device 320 utilizing any one of a number of transfer protocols (e.g., broadcast transmissions, HTTP). While the persistent storage 322 is shown in an example embodiment to be a single medium, it may include multiple media (e.g., a centralized or distributed database, and/or associated caches and servers) that store one or more sets of instructions. Accordingly, it may be any machine-readable medium that is capable of storing, encoding or carrying a set of instructions for execution by the machine (i.e., data processing system) and that cause the machine to perform any one or more of the methodologies of the present invention, or that is capable of storing, encoding or carrying data structures utilized by or associated with such a set of instructions. It may include, but not be limited to, solid-state memories, optical and magnetic media, and carrier wave signals.

As disclosed herein, instructions 324 may include instructions for conducting device discovery to find an optimal communication path through a master controller to an operations center, instructions for monitoring a plurality of states for individual field assets of the plurality of field assets, instructions for encoding a portion of the plurality of monitored states, and instructions for transmitting through the communication path the encoded portion of the plurality of monitored states. In addition, stored within storage 305 may be one or more sets of instructions that enable data processing system 300 to perform as or with a product detection system, a currency tracking system, a transaction report system, and an operating conditions system.

Figure 4:
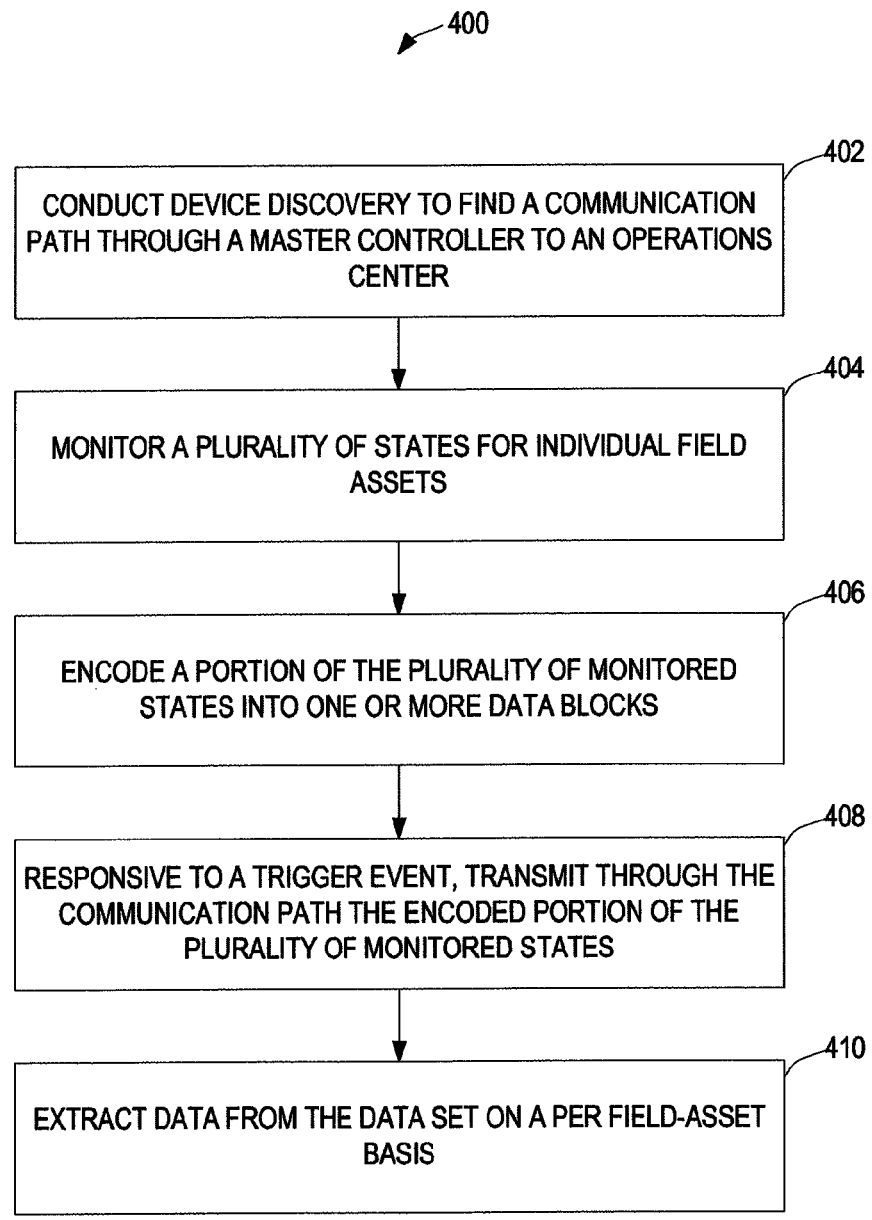
FIG. 4 illustrates a methodology for remotely monitoring field assets in accordance with disclosed embodiments.

FIG. 4 illustrates a method 400 for remotely monitoring field assets in accordance with disclosed embodiments. As shown, method 400 includes conducting (block 402) device discovery to find a communication path through a master controller to an operations center. In some embodiments, the communication path is through at least one client controller that is in direct communication with one or more other field assets. A plurality of states for individual field assets are monitored (block 404) and encoded (block 406) into one or more data blocks. In some embodiments, the monitored and encoded states are compressed. Responsive to a trigger event, the encoded states are transmitted (block 408) to the operations center. The trigger event may be from the master controller, from an alarm state, from a scheduled report interval, or provided in real time from an operations center. The master controller may be associated with a SIM card, and in some embodiments, the master controller communicates through a transceiver using one or more mobile telephone protocols. Example states that are monitored and encoded may relate to product inventory amounts, currency inventory amounts, sales data, temperature data alarm data, and other operating data. In some embodiments, data is extracted (block 410) individually for each field asset (from a transmitted data set) and stored separately for each field asset.

While the disclosed systems may be described in connection with one or more embodiments, it is not intended to limit the subject matter of the claims to the particular forms set forth. On the contrary, disclosed systems are intended to include alternatives, modifications and equivalents as may be included within the spirit and scope of the subject matter as defined by the appended claims.

What is claimed is:

1. At least one non-transitory machine readable medium comprising instructions that when executed on a computing device cause the computing device to perform a method comprising:
conducting device discovery to find a communication path through a master controller, included among two or more potential master controllers, to an operations center and assigning master controller duties to the master controller;
communicating a trigger event, through the master controller, to field assets;
monitoring a plurality of states for individual field assets of the field assets;
encoding and compressing a portion of the plurality of monitored states; and
responsive to the trigger event, transmitting through the communication path the encoded and compressed portion of the plurality of monitored states.

2. The at least one medium of claim 1, wherein the master controller is in direct communication with at least one of the field assets.

3. The at least one medium of claim 1, wherein the trigger event is from the master controller.

4. The at least one medium of claim 1, wherein the communication path includes the field assets.

5. The at least one medium of claim 1, wherein the master controller communicates through a transceiver using one or more mobile telephone protocols.

6. The at least one medium of claim 1, wherein the master controller is associated with a subscriber identity module.

7. The at least one medium of claim 1, wherein the trigger event is an alarm state.

8. The at least one medium of claim 1, wherein the trigger event is a scheduled report interval.

9. The at least one medium of claim 1, wherein the plurality of states include product inventory data.

10. The at least one medium of claim 1, wherein the plurality of states include currency inventory data.

11. The at least one medium of claim 1, wherein the plurality of states include alarm data.

12. The at least one medium of claim 1, wherein the plurality of states includes temperature data.

13. The at least one medium of claim 1, wherein the trigger event is a request to receive information.

14. The at least one medium of claim 1, wherein the trigger event is sent from a central data server and the method comprises encoding and compressing only the portion of the plurality of monitored states.

15. At least one non-transitory machine readable medium comprising instructions that when executed on a computing device cause the computing device to perform a method comprising:
  contributing product inventory information to a data set via a detection system;
  communicatively coupling a controller, included in the computing device, to the detection system;
  via a transmitter, (a) transmitting a compressed portion of the data set in response to at least one trigger event, and (b) communicatively coupling the transmitter to the controller and at least two field assets; and
  via the controller discovering a path, through the computing device and the at least two field assets, to a master controller included among two or more potential master controllers and assigning master controller duties to the master controller based on strength of signal information from the computing device and the at least two field assets.

16. The at least one medium of claim 15, the method comprising, via a report generator, extracting data from the data set individually for each field asset;
  wherein the master controller includes one of the at least two field assets.

17. The at least one medium of claim 15, wherein the data set includes an industry standard format and the method comprises assigning master controller duties to the master controller based on votes from the computing device and the at least two field assets.

18. The at least one medium of claim 15, the method comprising determining the controller is the master controller based on a determination that the controller has a favorable communication link to the operations center;
  wherein the at least one non-transitory machine readable medium is included in at least one of the computing device and at least two field assets.

19. The at least one medium of claim 15, the method comprising the transmitter timing transmissions to avoid collisions with transmissions from other transmitters.

20. At least one non-transitory machine readable medium comprising instructions that when executed on a computing device having at least one processor cause the computing device to perform a method comprising:
  conducting device discovery to find a communication path through a master controller, included among two or more potential master controllers, to an operations center and assigning master controller duties to the master controller;
  monitoring a plurality of states for at least one individual field asset;
  encoding and compressing a portion of the plurality of monitored states; and
  responsive to a trigger event, transmitting through the communication path the encoded and compressed portion of the plurality of monitored states;
  wherein the trigger event is communicated through the master controller.

21. The at least one medium of claim 20, wherein the trigger event includes a request to receive information.

22. The at least one medium of claim 20, wherein the trigger event is communicated from the master controller to the computing device.

23. The at least one medium of claim 20, wherein the at least one individual field asset includes the computing device.

24. The at least one medium of claim 20, wherein the trigger event is sent from a central data server to the computing device and the method comprises encoding and compressing only the portion of the plurality of monitored states.

* * * * *